(12) United States Patent
Bürger

(10) Patent No.: US 6,868,952 B2
(45) Date of Patent: Mar. 22, 2005

(54) PARKING LOCK MECHANISM AND A ROLLER BEARING OUTER RACE FOR SAME

(75) Inventor: Hans Bürger, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/000,435

(22) Filed: Nov. 30, 2001

(65) Prior Publication Data
US 2002/0079190 A1 Jun. 27, 2002

(30) Foreign Application Priority Data
Nov. 30, 2000 (DE) .......................................... 100 59 417

(51) Int. Cl.[7] ............................................... F16D 11/00
(52) U.S. Cl. ..................... 192/219.4; 74/411.5; 188/31; 384/564
(58) Field of Search ............................... 192/18 R, 69.9, 192/69.8, 110 B, 219.4; 74/411.5; 188/31, 69; 384/550, 564, 901, 906

(56) References Cited

U.S. PATENT DOCUMENTS

| | | | |
|---|---|---|---|
| 2,735,528 A | | 2/1956 | Dodge |
| 2,883,020 A | * | 4/1959 | Kummich et al. ........ 192/18 R |
| 4,108,291 A | * | 8/1978 | Zenker ..................... 192/18 R |
| 4,303,151 A | | 12/1981 | Kolacz |
| 4,782,719 A | * | 11/1988 | Yarnell ..................... 74/606 R |
| 5,022,506 A | | 6/1991 | Philippe |
| 5,083,993 A | | 1/1992 | Öun |
| 5,228,355 A | * | 7/1993 | Smith et al. .................. 74/467 |
| 5,267,636 A | | 12/1993 | Fielding |
| 5,651,435 A | | 7/1997 | Perosky et al. |
| 5,800,072 A | * | 9/1998 | Buch et al. ................. 384/568 |
| 6,073,502 A | * | 6/2000 | Wallace ..................... 74/69.9 |

FOREIGN PATENT DOCUMENTS

| | | |
|---|---|---|
| DE | 1 101 172 | 3/1961 |
| DE | 39 30 173 | 1/1991 |
| DE | 198 39 154 | 6/2000 |
| DE | 199 10 576 | 9/2000 |

* cited by examiner

Primary Examiner—Richard M. Lorence
(74) Attorney, Agent, or Firm—Kenyon & Kenyon

(57) ABSTRACT

To provide an inexpensive parking lock mechanism for a countershaft transmissions, the transmission shaft is locked relative to a bearing outer race of a tapered roller bearing. This bearing outer race is rotationally fixed relative to the transmission housing and one of two tapered roller bearings which are mutually arranged in an X and support the transmission shaft.

10 Claims, 2 Drawing Sheets

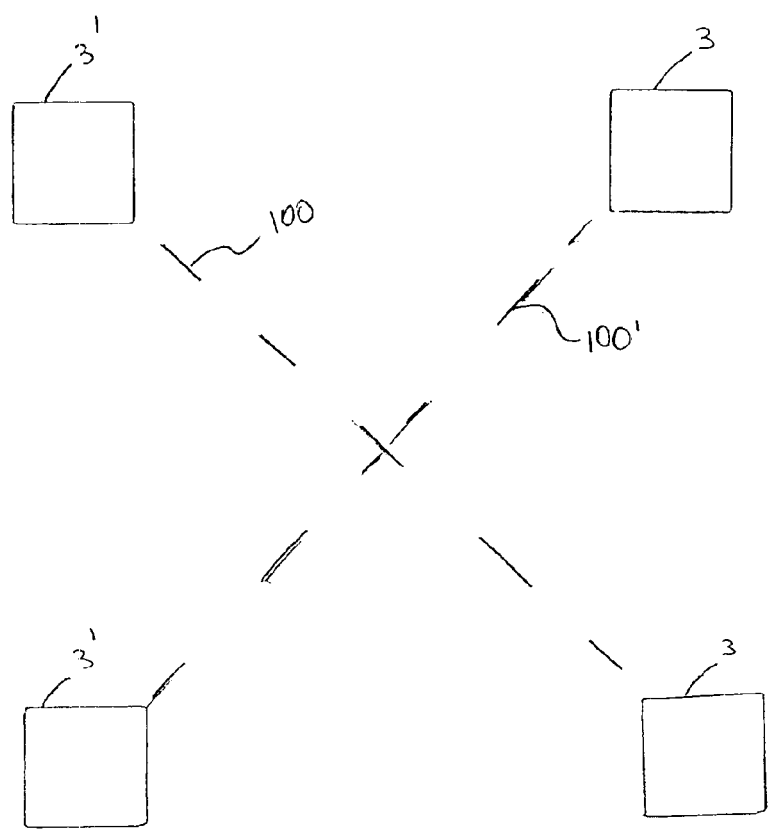

PARKING LOCK MECHANISM AND A ROLLER BEARING OUTER RACE FOR SAME

FIELD OF THE INVENTION

The present invention relates to a parking lock mechanism and to a roller bearing outer race for a parking lock mechanism.

BACKGROUND INFORMATION

German Published Patent Application No. 19 910 576 describes a parking lock mechanism for a countershaft transmission of a motor vehicle. The transmission shaft can be locked relative to a transmission housing by the parking lock mechanism. For this purpose, a sliding sleeve is arranged coaxially on the transmission shaft in a rotationally fixed connection. The sliding sleeve can be secured, engaged with a toothed ring supported in a rotationally fixed manner with respect to the transmission housing. The transmission shaft is mounted via a tapered roller bearing with respect to the transmission housing.

Furthermore, U.S. Pat. No. 5,651,435 describes a vehicle transmission according to a different generic definition having a reverse gear braking device with which a transmission shaft can be frictionally locked relative to a conical ring in a rotationally fixed connection to the transmission housing.

It is an object of the present invention to provide an inexpensive parking lock mechanism for a countershaft transmission.

SUMMARY

The above and other beneficial objects of the present invention are achieved by providing a parking lock mechanism and a roller bearing outer race for a parking lock mechanism as described herein.

One advantage of the present invention is that only one part is needed, fulfilling both the function of torque support of the shift fork with respect to the transmission housing to produce a parking lock mechanism and of support of the transmission shaft inside the transmission housing.

According to another advantage of the present invention, only one part is hardened. This results in additional savings, and both the roller bearing and the parking lock mechanism, which is exposed to high forces when parked on a hill, for example, may be wear resistant. When in engaging the parking lock mechanism in particular, there may not be any deformation of the gearing with the corresponding disadvantage in regard to meshing of the gearing. Case hardening is one of the many possible forms of surface hardening which combines the advantages of high wear resistance and tough performance characteristics, so it may be especially advantageous. Such tough performance characteristics may be advantageous when the parking lock mechanism is suddenly engaged, for example.

The form-fitting, rotationally fixed connection between the bearing outer race and the transmission housing may prevent relative movements between the roller bearing outer race and the transmission housing.

An example embodiment of the present invention may reliably prevent unwanted automatic disengagement of the parking lock mechanism. Due to the use of a locking mechanism, it is possible for the first time to use gearing on the end face inside the transmission housing, which may be especially advantageous. Thus, the parking lock mechanism remains reliably engaged even when parked on a hill, although the high forces prevailing in such a situation tend toward releasing the parking lock mechanism. These high forces develop due to the angle at the end gearing between the individual components of the parking lock mechanism, i.e., between:

an axially displaceable body, such as a sliding sleeve; and the roller bearing outer race.

On the other hand, the high forces permit easy release of the parking lock mechanism even under load.

In an example embodiment of the present invention, firstly, a desired bearing pre-stress of the transmission shaft is achieved, and secondly, the roller bearing outer race needs to be secured only in the direction of rotation because it is impossible to secure the roller bearing outer race against displacement in the direction toward the other roller bearing outer race because of an X arrangement.

In another example embodiment of the present invention, it is possible to release the parking lock mechanism using a low force even when parked on a hill, i.e., under load, in comparison with gearing on the outer circumference of the roller bearing outer race, for example.

In another example embodiment of the present invention, a high torque transmission capability of the roller bearing outer race to the transmission housing is achieved through multiple pins. The use of multiple pins is possible without any manufacturing-related tolerance problems because using a lightweight cast metal for the transmission housing allows the material to yield within certain limits. This gives a uniform distribution of torque among the individual pins the first time a load is applied to the parking lock mechanism.

In an example embodiment of the roller bearing race according to the present invention, a bearing pre-stress of the transmission shaft is achieved on the one hand, while on the other hand, the roller bearing outer race needs to be secured only in the direction of rotation because, due to the X arrangement, it is impossible to secure the roller bearing outer race against displacement in the direction toward the other roller bearing outer race. Furthermore, this example embodiment also has the advantage over gearing on the outer circumference of the roller bearing outer race that the parking lock mechanism may be released with a low force even when parked on a hill, i.e., under load.

BRIEF DESCRIPTION OF THE DRAWINGS

FIG. 3 is a schematic representation of the bearing arrangement.

DETAILED DESCRIPTION

Figure 1:
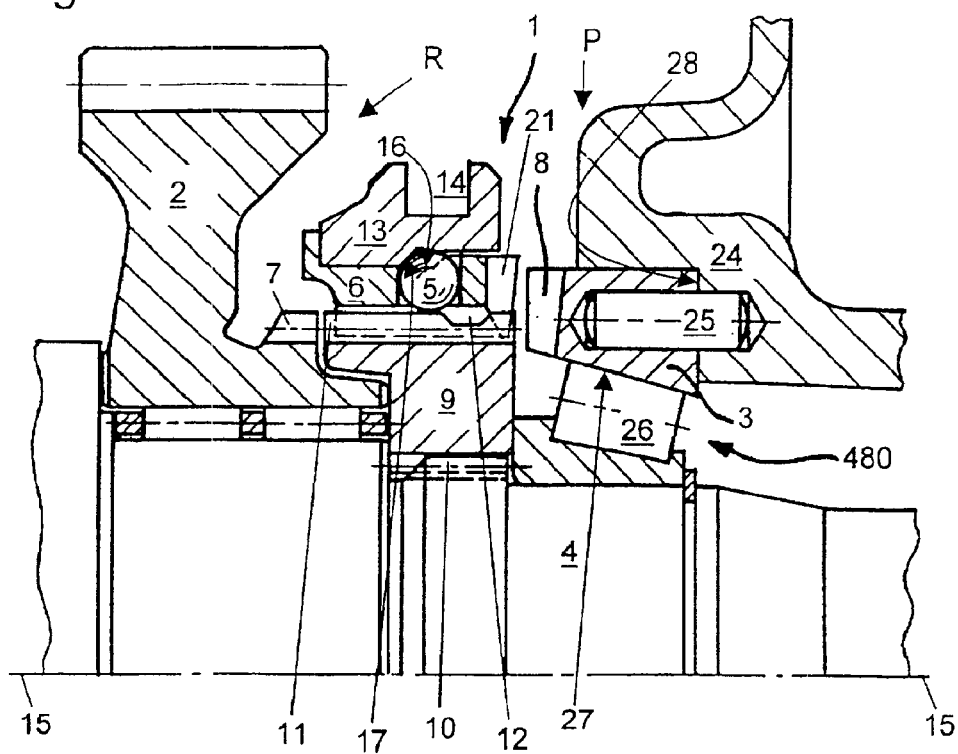
FIG. 1 is a cross-sectional view of a portion of a vehicle transmission having a positive locking clutch in a neutral position, the positive locking clutch having a locking mechanism.

FIG. 1 illustrates a portion of a vehicle transmission having a positive locking clutch 1 in a neutral position. In the neutral position, a first idler pulley 2 assigned to reverse gear "R" and a locking ring 3, which is assigned to parking lock mechanism "P" and is fixedly mounted on the transmission housing, are uncoupled from transmission shaft 4 and may rotate relative to it. Transmission shaft 4 is mounted so it may rotate in a transmission housing 24 made of a cast aluminum alloy with the help of two pre-stressed tapered roller bearings arranged in an X formation relative to one another so they may rotate in a transmission housing 24 made of a cast aluminum alloy, although only one tapered roller bearing 480 is illustrated. Locking ring 3 forms the roller bearing outer race of tapered roller bearing 480 illustrated. In the X arrangement, schematically illustrated in FIG. 3, a roller bearing outer race forms an angle which opens toward the inside of the transmission housing, so that the axial force component acting on the roller bearing outer race is constantly pressing the roller bearing outer race against an axial contact surface 28 of transmission housing 24. As shown in FIG. 3, broken lines 100 and 100' interconnect diagonally opposed bearings 3 and 3' and are used to illustrate the X configuration of bearings 3 and 3'. For rotationally fixed locking against transmission housing 24, locking ring 3 has six pins 25 distributed uniformly around the circumference. These pins 25 are aligned in parallel with transmission shaft 4 and are accommodated at one end in bores in locking ring 3 with a clearance fit and at the other end in aligned bores in transmission housing 24.

Positive locking clutch 1, which may be shifted by a shift fork is arranged axially between idler pulley 2 and locking ring 3, this positive locking clutch 1 including:

locking roller elements 5 configured as conventional roller bearing balls;

a roller element support 6 having an internal gearing 12 and an end gearing 21;

a shift gearing 7 assigned to idler pulley 2 and a transmission housing gearing 8 assigned to locking ring 3; and a synchromesh body 9 having an external gearing 11.

Transmission housing gearing 8 is incorporated directly on an end face of the roller bearing outer race or locking ring 3. Transmission housing gearing 8 is incorporated before performing case hardening, which is necessary to increase the wear resistance of the gearing and a bearing surface 27 for tapered roller bearings 26.

Multiple idler pulleys are rotatably arranged via roller bearings coaxially with transmission shaft 4 of the vehicle transmission having a parking lock mechanism "P" inside the transmission in a conventional manner, but only idler pulley 2 assigned to reverse gear "R" is illustrated as an example. Synchromesh body 9 is connected by a shaft-hub gearing 10 to transmission shaft 4 in a rotationally fixed manner in the circumferential direction. Furthermore, synchromesh body 9 is provided with external gearing 11 extending in the axial direction on the circumference, meshing with internal gearing 12 of roller element support 6, establishing a rotationally fixed but axially displaceable connection. Roller element support 6 is arranged radially inside a sliding sleeve 13 having a circumferential groove 14 which meshes in the conventional manner with a shift fork that initiates axial forces/displacements.

Figure 2:
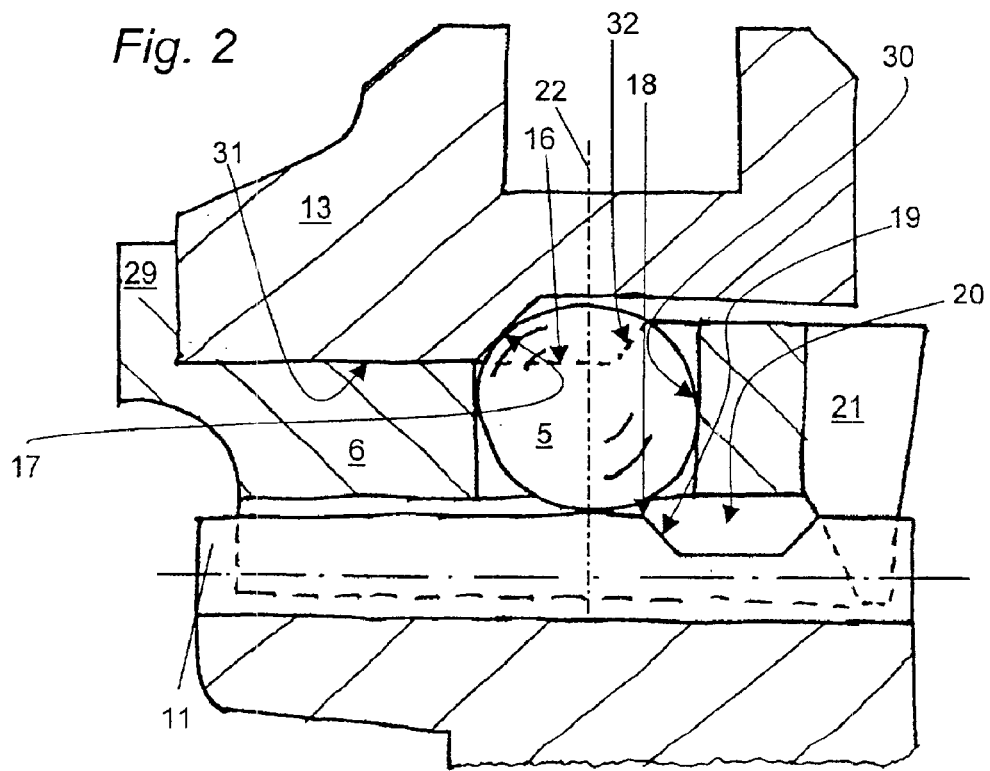
FIG. 2 is a cross-sectional view of a detail of the locking mechanism illustrated in FIG. 1.

FIG. 2 illustrates that several bores extending radially are distributed uniformly around the circumference in roller element support 6 and are in a plane perpendicular to a transmission shaft axle 15 of vehicle transmission shaft 4. One locking roller element 5 is arranged in each of these bores, only one of which is illustrated. In the neutral position of positive locking clutch 1 illustrated, locking roller elements 5 project radially beyond roller element support 6. Sliding sleeve 13 has a ring groove on its inside which is open on the side facing locking ring 3. Locking roller elements 5 which project beyond an outer lateral surface 16 of roller element support 6 engage in this ring groove. Locking roller elements 5 are in contact with sliding sleeve 13 in the area of an inclined ring groove wall, i.e., an inclined ring groove surface 17 of the ring groove.

Sliding sleeve 13 is supported axially on a shoulder 29 on roller element support 16 in the direction toward idler pulley 2, i.e., to the left. Transmission shaft 4 and idler pulley 2 may thus be coupled in a rotationally fixed manner by positive locking clutch 1 without locking the locking roller elements 5.

The tooth of external gearing 11 on which locking roller element 5 rests is followed over an edge 18 by a bevel 19 which leads into a radial recess 20.

Roller element support 6 is provided with end gearing 21 which corresponds to transmission housing gearing 8 fixedly bolted to the transmission housing. End gearing 21 and transmission housing gearing 8 therefore form an end gearing pair.

The functioning of positive locking clutch 1 is described below for the case when parking lock mechanism "P" is engaged from the neutral position. Its functioning is explained in simplified terms on the basis of one locking roller element 5 illustrated.

For form-fitting coupling or for engagement of parking lock mechanism "P" the shift fork is moved to the right. Consequently, sliding sleeve 6, which is supported axially on the shift fork, is also shifted to the right. Then, due to the supporting of locking roller element 5 on ring groove bevel 17, roller element support 6 is also shifted to the right. As soon as a mid-plane 22 of locking roller element 5 crosses over edge 18, as illustrated in the detail in FIG. 2, locking roller element 5 is displaced radially inwardly. With this inward displacement, reactive forces act against locking roller element 5 includes:

on ring groove bevel 17 of the ring groove; and on a right bore wall area 30 of roller element support 6.

Depending on the angle of ring groove bevel 17 or bevel 19, bracket body 6 begins to lag somewhat behind the displacement of sliding sleeve 13. After reaching a locking position of roller element support 6 in which it drops below radial inside ring face 31 of sliding sleeve 13, there is only a slight displacement of sliding sleeve 13 up to an end position of the sliding sleeve. In this sliding sleeve end position, sliding sleeve 13 together with ring groove bevel 17 comes to rest against a matching parallel bevel 32 of roller element support 6.

Contact of end gearing 21 with transmission housing gearing 8 is associated with a high force due to the static torque such as that occurring when parked on a gradient, for example. The flanks of the teeth are configured with a tooth angle, which is greater than a self-locking angle so that jamming due to supporting the high static torque is reliably ruled out. An axial reactive force occurring constantly due to the force from the static torque or the tooth angle when parking lock mechanism "P" is engaged and which depends on the coefficient of friction between the flanks of the teeth does not result in disengagement of positive locking clutch 1 due to its being locked. It is impossible to disengage positive locking clutch 1, because locking roller element 5 introduces a normal force into sliding sleeve 13 in the radial direction, due to an angle of bevel 19. This normal force is incapable of axially displacing sliding sleeve 13.

In another example embodiment of the present invention, only one ball is provided for locking the positive locking clutch in an engaged position. Furthermore, in other example embodiments, any number of locking roller elements may be provided for locking, in which case they are arranged symmetrically around the circumference, or, in the case of an even number, in diametric opposition to one another to prevent tilting movements of the three components:
- synchromesh body;
- roller element support; and
- sliding sleeve.

In alternative example embodiments, instead of contact of the two bevels as illustrated, the end gearing may also come to rest against the flanks of the teeth of the transmission housing gearing in the end position of the sliding sleeve. Furthermore, this contact may be accomplished by the tip and root diameter planes of the end gearing/transmission housing gearing striking against one another.

Instead of the end gearing pair illustrated, which is formed by the end gearing and the transmission housing gearing, a contrate gearing may also be used. Furthermore, any other end gearing pair may also be used. Company-specific names for such end gearing pairs include: Hirth serration, Gleason gearing (™) and Cyclopaloid gearing.

The locking roller elements may also be configured as cylindrical or barrel-shaped rollers, for example.

Instead of the tapered roller bearing, any other roller bearing may also be used, in particular helical roller bearings, such as angular contact roller bearings.

The locking ring/roller bearing outer race may be hardened by any method, surface hardening in particular.

The transmission housing may be made of any material. In addition to cast aluminum alloys, suitable lightweight metal alloys include cast magnesium alloys in particular.

In other example embodiments of the present invention, walker arms may also be used instead of gear shifts.

In other example embodiments, instead of the ring groove on the inside of the sliding sleeve, multiple grooves extend parallel to the axis of the shift fork. A locking roller element projects into each groove when the positive locking clutch is in the neutral position.

In other example embodiments, the parking lock mechanism is operated with a different shift fork from that assigned to the reverse gear. Depending on the type of shift actuator system, the parking lock mechanism may also be engaged and disengaged by a final controller element assigned exclusively to the parking lock mechanism.

Devices for form-fitting torque transmission of the locking ring to a transmission housing may also include, in addition to the six pins illustrated, screw connections, gearing, polygonal profiles, etc. Furthermore, any other number of pins is also possible. Even one pin may be sufficient.

Embodiments described herein are merely example embodiments. A combination of features described here for different embodiments is also possible. Other features of the parts of the device belonging to the present invention, in particular those not described here, may be derived from the geometric relationships of the parts of the device illustrated in the Figures.

What is claimed is:

1. A parking lock mechanism for an automotive transmission by which a transmission shaft mounted with roller bearings is lockable with respect to a transmission housing, comprising:
   a roller bearing outer race;
   an arrangement configured to connect the roller bearing outer race in a form-fitting, rotationally fixed manner to the transmission housing; and
   an axially displaceable body connectable in a rotationally fixed manner to the transmission shaft, the axially displaceable body lockable in a form-fitting and rotationally fixed manner directly with the roller bearing outer race.

2. The parking lock mechanism according to claim 1, further comprising a locking mechanism that is locked when the parking lock mechanism is engaged, the roller bearing outer race including a gearing arranged on an end face inside the transmission housing configured to rotationally fix and form-fittingly connect to the axially displaceable body.

3. The parking lock mechanism according to claim 1, further comprising a roller bearing pair including the roller bearing outer race, the roller bearing pair supporting the transmission shaft in an X arrangement, the roller bearing outer race including a gearing configured to rotationally fix and form-fittingly connect with the axially displaceable body arranged on an inside of the X arrangement.

4. The parking lock mechanism according to claim 3, wherein the gearing is arranged on the inside of the X arrangement.

5. The parking lock mechanism according to claim 4, wherein the arrangement includes a pin connection including multiple pins configured to form-fittingly and rotationally fixedly connect the roller bearing outer race with the transmission housing, the transmission housing including a light metal cast part.

6. A roller bearing outer race, comprising:
   an arrangement configured for form-fitting torque transmission to a transmission housing; and
   a gearing arranged on an end face of the roller bearing outer race engageable with a corresponding gearing.

7. The roller bearing outer race according to claim 6, wherein the roller bearing outer race includes a component of an angular roller bearing forming an X arrangement with a second angular roller bearing to support a transmission shaft, which is lockable with respect to the transmission housing, the gearing of the roller bearing outer race arranged on an inside end face with respect to the X arrangement.

8. The roller bearing outer race according to claim 7, wherein the arrangement configured for form-fitting torque transmission includes a pin connection.

9. A roller bearing outer race, comprising:
   means for form-fitting torque transmission to a transmission housing; and
   a gearing arranged on an end face of the roller bearing outer race engageable with a corresponding gearing.

10. A parking lock mechanism for an automotive transmission by which a transmission shaft mounted with roller bearings is lockable with respect to a transmission housing, comprising:
    a roller bearing outer race;
    means for connecting the roller bearing outer race in a form-fitting, rotationally fixed manner to the transmission housing; and
    an axially displaceable body connectable in a rotationally fixed manner to the transmission shaft, the axially displaceable body lockable in a form-fitting and rotationally fixed manner directly with the roller bearing outer race.

* * * * *